May 9, 1961  F. SINGER  2,983,206
SETTING MEANS FOR PHOTOGRAPHIC CAMERAS
Filed Feb. 7, 1958  3 Sheets-Sheet 1

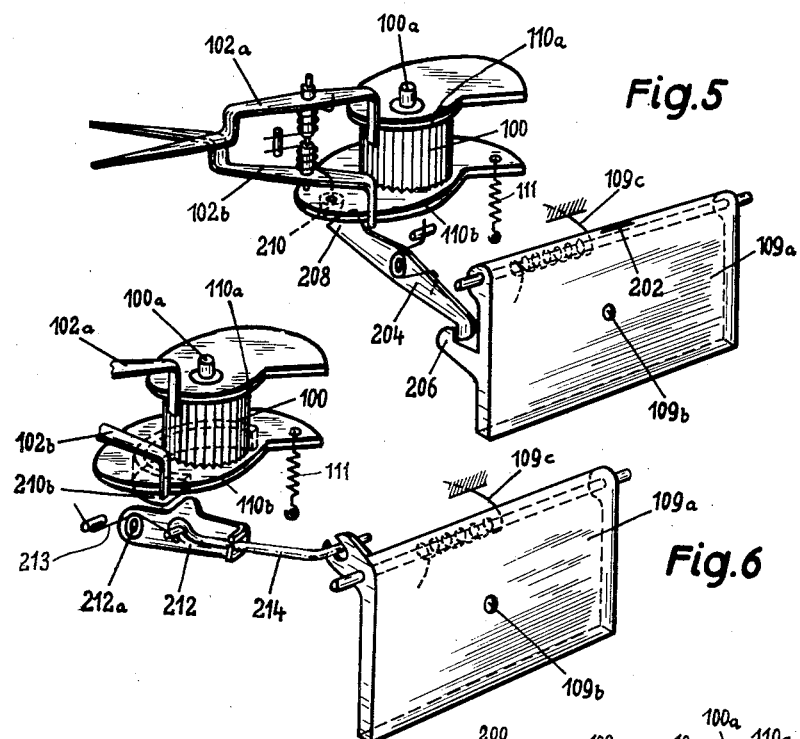
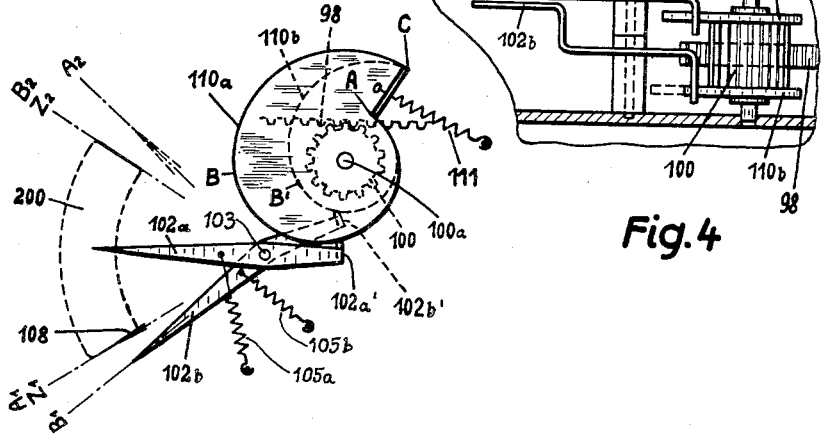

May 9, 1961 F. SINGER 2,983,206
SETTING MEANS FOR PHOTOGRAPHIC CAMERAS
Filed Feb. 7, 1958 3 Sheets-Sheet 3
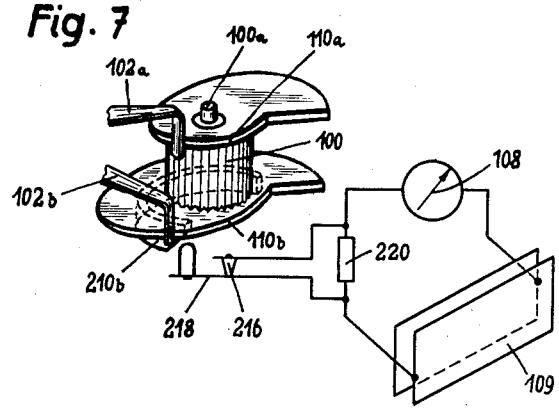
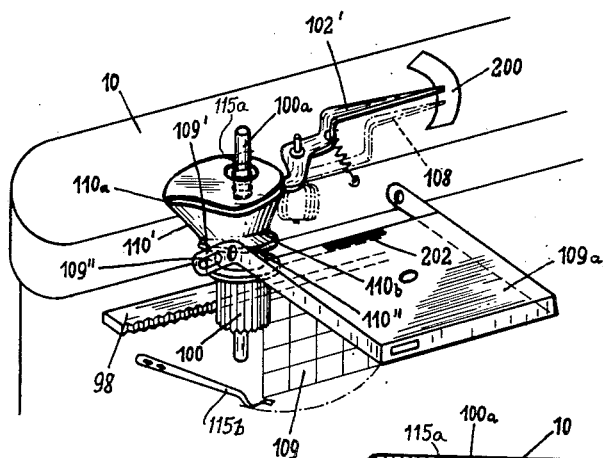
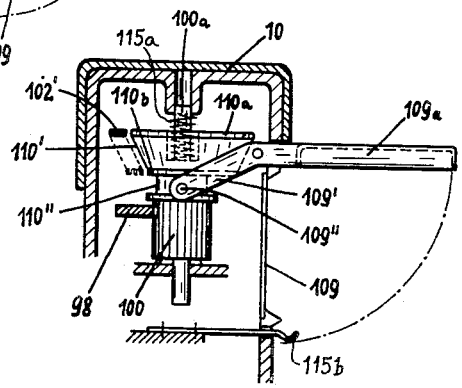

United States Patent Office 2,983,206
Patented May 9, 1961

2,983,206

SETTING MEANS FOR PHOTOGRAPHIC CAMERAS

Franz Singer, Munich, Germany, assignor to Compur-Werk Friedrich Deckel O.H.G., Munich, Germany, a German firm Filed Feb. 7, 1958, Ser. No. 713,845

Claims priority, application Germany Feb. 9, 1957

5 Claims. (Cl. 95—10)

The present invention relates to photographic cameras, and more particularly to the means for setting the adjustable members of a shutter unit or shutter assembly on a camera.

An object of the invention is the provision of generally improved and more satisfactory setting means of this character.

Another object is the provision of improved setting means particularly useful in connection with a photoelectric exposure meter having a plurality of ranges of sensitivities.

Still another object is the provision of improved means for setting a shutter assembly by the use of a follow-up pointer cooperating with the pointer of a plural-range exposure meter.

A further object is the provision, in a photoelectric exposure meter assembly of the type having a plurality of sensitivity ranges, of improved follow-up pointer means operatively connected to the adjustable members of a shutter assembly.

A still further object is the provision of simple means for shifting the sensitivity range of a plural-range exposure meter, automatically or semi-automatically from the movement of setting the shutter assembly to various exposure values.

These and other desirable objects may be attained in the manner disclosed as an illustrative embodiment of the invention in the following description and in the accompanying drawings forming a part hereof, in which:

Fig. 3 is a plan of certain parts of the follow-up pointer mechanism according to a first embodiment of the present invention;

Fig. 4 is an elevation of the parts shown in Fig. 3, with associated parts of the camera body in vertical section;

Fig. 5 is a perspective view illustrating a second embodiment of the invention;

Fig. 6 is a similar view illustrating a third embodiment;

Fig. 7 is a view partly in perspective and partly schematic, illustrating a fourth embodiment;

Fig. 8 is a similar view showing a fifth embodiment;

Fig. 9 is a vertical section through certain of the parts shown in Fig. 8.

The same reference numerals throughout the several views indicate the same parts.

Figure 1:
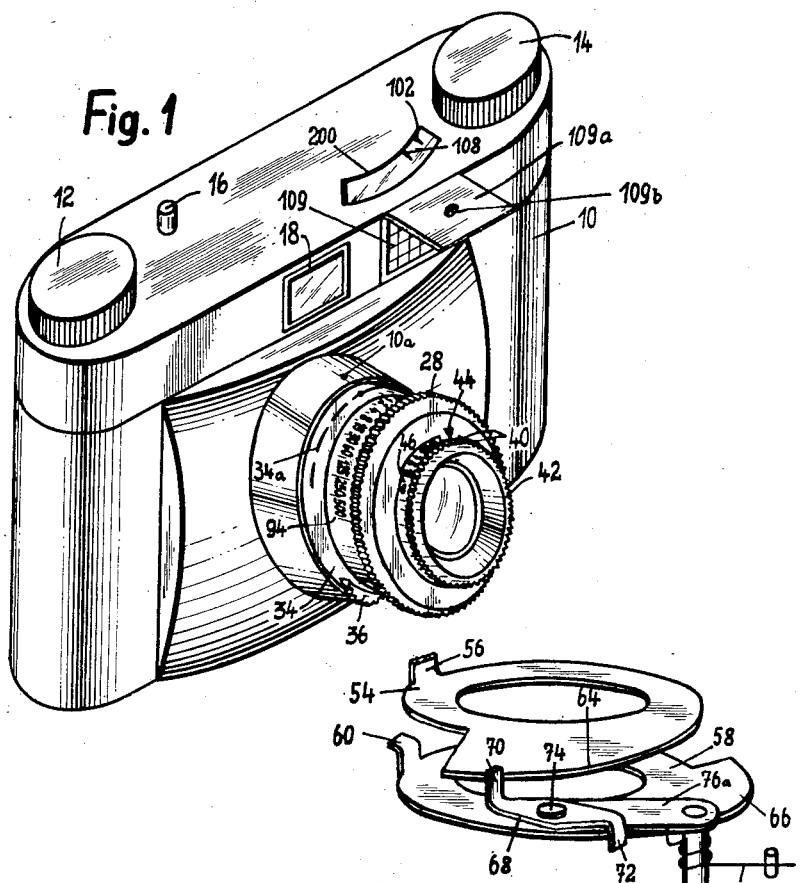
Fig. 1 is a perspective view of a typical form of camera with which the present invention may be used.

The following description presupposes that the reader is already familiar with the concept of setting or adjusting a photographic shutter in accordance with an "exposure value" (sometimes called "total exposure value" or "integrated exposure value") which expresses a relationship between the shutter speed setting and the diaphragm aperture setting without reference to the absolute value of either of these two factors. Within reasonable limits there are, for any given exposure value, a number of different pairs of coordinate or complementary shutter speed settings and diaphragm aperture settings which represent the same exposure value, and the user may select any one of these pairs, or shift from one pair to another, without changing the exposure value. But a change in the shutter speed setting without a corresponding change in the diaphragm aperture setting, or vice versa, will result in a change in the exposure value. The exposure value concept is fully explained in the copending patent application of Kurt Gebele, Serial No. 389,775, filed November 2, 1953, now Patent 2,829,574, granted April 8, 1958.

Also the following description proceeds on the assumption that the reader is familiar, at least in a general way, with photoelectric exposure meters built into cameras, and with so-called follow-up pointers connected to the shutter setting mechanism in such a way that a change in the exposure value setting of the shutter will change the position of the follow-up pointer. With such an arrangement, the shutter may be adjusted until the connected follow-up pointer is alined with (or in other predetermined relation to) the movable pointer of the built-in exposure meter, and when this is accomplished, the shutter will have been set to the exposure value indicated by the exposure meter, without the necessity of expressing the exposure value as a numerical quantity and without the necessity of mentally transferring any reading or value from the exposure meter to the shutter mechanism. Examples of such follow-up pointers are disclosed in the copending patent applications of Kurt Gebele, Serial No. 566,804, filed February 21, 1956, and Paul Fahlenberg, Serial No. 576,634, filed April 6, 1956 (now Patent 2,849,936, granted September 2, 1958), and Kurt Gebele and Franz Singer, Serial No. 707,796, filed January 8, 1958, and Kurt Gebele, Serial No. 710,212, filed January 21, 1958 (now abandoned) and Kurt Gebele, Serial No. 711,605, filed January 28, 1958 (now Patent No. 2,949,069, granted August 16, 1960). The present invention may be regarded as in some respects an improvement upon the constructions disclosed in the several applications just mentioned.

The present invention deals particularly with the follow-up pointer mechanism, rather than the details of the camera on which the follow-up pointer is used, or the details of the motion connection or transmission from the shutter assembly to the vicinity of the follow-up pointer. Wide variations in the camera construction, and in the details of the transmission extending from the shutter assembly to the vicinity of the follow-up pointer, are possible without affecting the present invention, so long as the shutter assembly is of a kind which makes provision for setting the shutter speed adjustment and the diaphragm aperture adjustment according to the "exposure value" concept, and so long as there is a motion transmission mechanism for moving a movable member in the vicinity of the exposure meter to a variable position according to the exposure value to which the shutter assembly is set. It is the driving of the follow-up pointer from the movable member positioned according to the exposure value, with which the present invention is particularly concerned, rather than the way in which the movable member itself is positioned.

Hence for purposes of the present invention, the movable member above mentioned may be driven or positioned by the shaft 216 in Fig. 1 of said application 566,804, or the shaft 56 in Fig. 1 of said application 707,796, or the shaft 266 in Fig. 7 of said application 711,605, or the shaft 96 in Fig. 6 of said application 710,212, since in each instance the mentioned shaft is positioned in accordance with the exposure value to which the shutter assembly is set.

Figure 2:
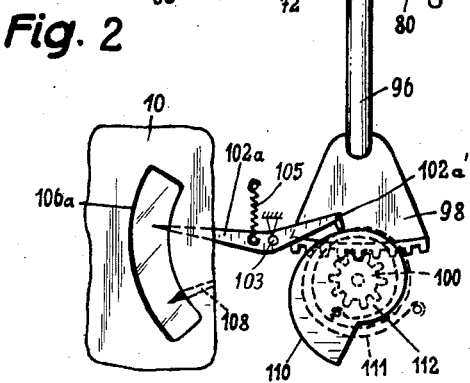
Fig. 2 is a perspective view of a typical form of connection between certain exposure value elements of the shutter assembly and a follow-up pointer on the camera body, this view serving to illustrate the background or environment of the present invention.

As a convenient example of one possible constructiin, the present invention is illustrated as applied to a still camera of the kind disclosed in said application 710,212 and the various parts in Figs. 1 and 2 of the present drawings bear the same reference numerals as the corresponding parts in the application just mentioned. Detailed description of these parts is thought to be superfluous here, reference being made to the application just mentioned for any further description that may be desired. It is sufficient here to say that the camera body 10 carries a shutter assembly which includes the usual lens, movable shutter blades, and adjustable iris diaphragm leaves. The adjusting rings 28 and 34 rotate about the optical axis of the lens as a center. Turning the ring 34 by the finger piece 36 serves to adjust the diaphragm aperture without changing the shutter speed, and hence changes the exposure value for which the shutter assembly is set. This possibility of variation is limited by the range of the diaphragm aperture. Under normal lighting conditions, however, this range is sufficient to set the correct exposure value. Turning the ring 28 serves to adjust the shutter speed but also turns the ring 34 to adjust the diaphragm aperture to a compensating or complementary extent, so that the exposure value is not altered, a suitable coupling between the rings 28 and 34 being known per se as shown, for example, at 48, 50 in Fig. 2 of the drawings of the above mentioned application 710,212. A change in the shutter speed setting without a corresponding change in the diaphragm setting also serves to change the exposure value. This, however, is only necessary when the setting range of the ring 34 is not sufficient for correct exposure value setting.

The cam rings 54 and 58 turn with the rings 28 and 34, respectively, so that the oppositely inclined cam surfaces 64 and 66, respectively, act on the cam follower lever 68 to position the arm 76a and the shaft 96 in a position which depends upon the exposure value to which the shutter assembly is set. Thereby the gear segment 98 fixed to the shaft 96 and located in the vicinity of the follow-up pointer 102a, operates a cam 110 to position the follow-up pointer 102a in a position corresponding to the exposure value for which the shutter assembly or unit is set. If the ring 34 of the shutter unit is turned to change the exposure value setting, this will alter the position of the follow-up pointer. Therefore, as a practical matter, the ring 34 may be turned one way or the other until the follow-up pointer is brought into alinement with a pointer 108 of a photoelectric light meter or exposure meter having a photocell 109 built into the camera body 10. When the follow-up pointer is brought into coincidence with the exposure meter pointer, the shutter assembly will have been set at the proper exposure value indicated by the exposure meter, neglecting for the moment the matter of film speed or sensitivity and the matter of filter factor, which are adequately accommodated by other means known per se and need not be further considered in connection with the present invention. When the exposure value of the shutter assembly has thus been set by the use of the follow-up pointer, the operator is then free to turn the ring 28 (without changing the setting of the exposure value) to select any desired pair of coordinate or complementary settings of shutter speed and diaphragm aperture, such selection being aided by observing the shutter speed scale 94 or the depth of field indicator 40.

The exposure meter preferably has a plurality of ranges of sensitivity, e.g., a high sensitivity range for use under relatively dull or dim lighting conditions, and a low sensitivity range for use under relatively bright or intense lighting conditions. The shift from one range to another may be accomplished by moving a suitable shutter member from an effective to an ineffective position, or vice versa. For example, a shutter or flap member 109a is hinged to the camera body 10. When the flap is in the open position shown in Fig. 1, the entire area of the photocell 109 may receive light. When the flap is turned down to a closed position, light reaches the photocell only through the relatively small aperture 109b in the flap 109a, so that the exposure meter then operates in its low sensitivity or bright light range.

Obviously, a given position of the light meter pointer 108 represents different illumination conditions and a different exposure value, when the light meter is operating in one sensitivity range, than when it is operating in another sensitivity range. Hence means should be provided for correlating the follow-up pointer to the sensitivity range of the light meter, and it is to this problem of correlating the follow-up pointer with a plurality of sensitivity ranges of the light meter that the present invention is primarily addressed.

Referring now to Figs. 3 and 4, illustrating a first embodiment of the present invention, the vertical shaft 100a, rotatably mounted between two walls or partitions of the camera body 10, carries the pinion 100 which meshes with the gear member 98 driven from the shutter assembly in accordance with changes in the exposure value for which the shutter assembly is set, as above explained. Firmly connected to the pinion 100 to rotate therewith are two cam disks, an upper cam 110a and a lower cam 110b. Two follow-up pointers are provided, 102a and 102b, both turnable independently on a common pivot 103, and both urged by light springs 105a and 105b, respectively, in a direction to keep the tails 102a' and 102b', respectively, in contact with the cam peripheries of the disks 110a and 110b, respectively. The ends of the pointers 102a and 102b may move beneath and be visible through a window 200 in the top wall of the camera body, through which window the pointer 108 of the exposure meter powered by the photocell 109 is also visible.

The upper cam 110a has a rise in a radial direction, extending circumferentially from the point A to the point B, while from the point B to the end C of this cam, it has a constant radius without rise or pitch. The lower cam 110b, on the other hand, is of constant radius, without rise or pitch, from its beginning point A to the point B'. From this point B' to its end C, it has a rise in a radial direction. The course or shape of the two cams is so figured that, except for a short overlap, one rises in the sector where the other has no rise, and vice versa.

The result is obtained, by proper design of the cams, that when one of the follow-up pointers moves within the visible range beneath the window 200, the other pointer remains in a position beyond one end of the window and is out of sight, so that only one of these pointers at a time is visible through the window 200, thereby avoiding confusion of the operator. The exposure meter pointer 108, however, moves only within the limits of the window 200, through the angular range between the positions Z1 and Z2 in Fig. 3.

The cam 110a is so shaped that the follow-up pointer 102a swings in the range from the position A1 to the position A2 during the first part of the rotation of the cam in a counterclockwise direction, and remains or dwells stationary in the position A2 during approximately the second half of the turning motion of the cam. The other cam 110b is so figured that during approximately the first half of the counterclockwise rotation of the cam, the follow-up pointer 102b will dwell or remain stationary in the position B1 and then during approximately the second half of the rotation of the cam, the pointer 102b will swing in the range from the position B1 to B2. There is a slight overlap in the action of the cams on their respective follow-up pointers, so that just as one pointer swings out of view at one end of the window 200, the other follow-up pointer swings into view at the opposite end of the window.

An almost complete revolution of the pinion 100 which corresponds to the entire range of exposure values is obtained by turning the shaft 96 and the gear segment 98 operatively connected to the shaft 96. The turning of the shaft 96 is caused either by adjusting the diaphragm aperture or the shutter speed. In the first half of the revolution, e.g., from exposure value 1 to about exposure value 9, the exposure meter should operate in its high sensitivity range, with the flap 109a open. If the pointer 102a is the low sensitivity pointer and the pointer 102b is the high sensitivity pointer, then during the travel of the pinion 100 through the low exposure value part of its range the pointer 102a will remain out of sight in the position A2, and the follow-up pointer 102b will sweep through its range, visible through the window 200.

About the middle of the range of movement of the pinion 100 (i.e., when it reaches approximately the position corresponding to exposure value 9) the follow-up pointer 102b will move past the end of the window 200, toward the invisible position B1, and the other follow-up pointer 102a will come into view at the opposite end of the window 200, and will sweep across the arc of the window 200 as the exposure value influencing rings on the shutter assembly are turned farther and farther toward the highest exposure value. During this part of the movement, the exposure meter on the camera should be operating in its less sensitive range, with the flap 109a in closed position.

In order to avoid wrong correlation of the follow-up pointer with the exposure value range, different colors are used for identifying the follow-up pointers 102a and 102b. These colors correspond to the colored markings provided on the light meter shutter 109a. The light meter shutter 109a may have, for instance, a green mark 202 (Fig. 5) marked in such position on the edge of the shutter that it is visible to the operator when looking downwardly from above, when the shutter is closed, and is hidden from view when the shutter is swung to its open position. Consequently the corresponding follow-up pointer 102b is marked in green, whereas the other follow-up pointer 102a is marked in another color, for instance, white.

It is desirable also, in order to facilitate use of this device, to design the transmission gearing from the shutter assembly to the pinion 100 in such manner that the follow-up pointer which is visible through the window 200 will sweep across this window in the same direction in which the ring 34 is turned. In other words, as the top of the ring 34 is turned to the right, the follow-up pointer will sweep across the window 200 to the right, and as the ring 34 is turned to the left, the follow-up pointer will turn to the left. This makes the proper setting somewhat easier and quicker, especially in the hands of a beginner.

In the invention embodiment thus far described, utilizing the colored markings including the colored mark on the flap 109a, the setting of the flap to one position or the other is effected by hand. This requires a certain amount of attention on the part of the operator when passing from one measurement range to the other. In order to reduce the required attention and mental activity to a minimum or eliminate it entirely, it is desirable to provide automatic or semi-automatic means for positioning the flap 109a of the exposure meter.

Referring now to a second embodiment of the invention as illustrated in Fig. 5, the parts are the same as previously described except that the flap 109a is operated in what may be called a semi-automatic manner. The hinge of the flap is under the influence of a light spring 109c which tends to swing the flap to an open position. It is held in closed position by a pivoted latching lever 204, the nose of which engages a latching hook 206 on the mask or flap member 109a. The opposite end of the latching lever 204 has a tail portion 208 which lies in the path of a projection 210 mounted on the lower cam member 110b.

When the exposure value setting parts of the shutter assembly are moved from the low exposure value part of the range toward the relatively high exposure value part of the range, so that the exposure meter should operate at low sensitivity, the mask or flap 109a should be closed by hand, and will remain in closed position, due to the latch 204, 206. But when the exposure value setting member 34 is moved toward a lower exposure value, the projection 210 on the cam 110b will, at the proper time, engage the tail 208 of the latching lever 204 and move this latching lever against the light force of its spring, to release the latching hook 206 of the mask 109a so that the spring 109c automatically moves the mask to its open position.

In Fig. 6 there is shown a somewhat similar arrangement in which the mask or flap 109a is moved automatically in both directions rather than only a single direction, so that in this third embodiment shown in Fig. 6 the mask has an action which may be described as fully automatic rather than merely semi-automatic. As before, the flap 109a has a spring 109c which tends to move it to open position. The lower cam 110b has an annular projection portion 210b which cooperates with an operating lever 212 pivoted on a stationary pivot 212a and urged upwardly by a spring 213 which is somewhat stronger than the spring 109c. A resilient spring arm 214 fixed to the actuating lever 212 extends into a notch formed on the mask or shutter 109a near its hinge pivot.

During that part of the rotation of the pinion 100 and cam 110b which corresponds to relatively high exposure value settings, where the light meter should operate in its low sensitivity or bright light range, the cam portion 210b does not engage the actuating lever 212, and thus the spring 213 holds the flap 109a in its closed position, placing the exposure meter in its low sensitivity range. When the pinion 100 and cam 110b are turned to a position in approximately the lower half of the exposure value scale, where the exposure meter should operate with maximum sensitivity for dim light, the cam portion 210b does engage the upstanding nose on the actuating lever 212, and swings this lever downwardly against the force of its spring 213, thereby shifting the flap 109a to its open position, for maximum sensitivity of the exposure meter. Thus the sensitivity range of the exposure meter is controlled automatically from the setting of the exposure value on the shutter assembly, and no attention on the part of the operator is needed. The colored mark 202 which was on the mask as shown in Fig. 5, may be omitted, and the colored marking 34a in Fig. 1 may likewise be omitted, these markings being unnecessary in this fully automatic form of the invention.

The use of the spring arm 214 for connecting the actuating lever 212 to the mask 109a, is advantageous in preventing damage to the parts if the operator wishes to close the flap 109a by hand while the pinion 100 is in a position in which the cam portion 210b holds the actuating lever 212 in its depressed position. For instance, when the operator has completed a picture which was taken with a low exposure value setting or high sensitivity range of the exposure meter, the operator can close the mask or flap 109a and lock it in closed position by a suitable latch (not shown) in order to put the camera back in its case, without having to shift the exposure value setting member to any different position. As soon as he removes the camera from the case for the next picture, and unlatches the mask latch, the resilience of the arm 214 will restore the flap 109a to the open position, if the exposure value parts of the shutter assembly are still in the maximum sensitivity measuring range.

Instead of changing from one sensitivity range to another by the use of a movable mask or flap, it is also possible, according to the present invention, to do this by other means, as for example connecting or disconnecting an electrical resistor. Such a construction is shown in Fig. 7, where the cam portion 210b on the cam disk 110b serves to open a normally closed electrical switch 216, 218 which by-passes a resistor 220 in the electric circuit of the exposure meter 108, 109. The cam portion 210b is oriented in such position relative to the cam disk 110b that the switch 216, 218 is open, rendering the resistor 220 effective, when the exposure meter is to operate in its low sensitivity range. When the switch is closed, it by-passes the resistor 220, and the exposure meter operates at its high sensitivity range.

In the previously described embodiment of Figs. 3 and 4, the follow-up pointers 102a and 102b had to be correlated with the coresponding exposure setting ranges by means of colored markings. This requires careful attention of the operator when shifting from one sensitivity range of the exposure meter to the other. Therefore it is desired to free the operator from this inconvenience. This may be accomplished by using the flap 109a of the exposure meter, which flap influences the sensitivity range of the exposure meter, as the shifting means for the follow-up pointer. Thus the correct correlation will be accomplished automatically. This idea is incorporated in the embodiment according to Figs. 8 and 9, utilizing only a single pointer for follow-up purposes, instead of two pointers. The two separate cam portions 110a and 110b are still provided, as before, both fixed to the pinion 100 to turn therewith as the pinion is driven from the gear member 98 which is positioned, in turn, from the exposure setting mechanism of the shutter assembly. But the entire pinion 100 and the cams 110a and 110b with it are movable in a direction axially of the pinion, to bring one or the other of the cam portions opposite the tail of the single follow-up pointer 102′, in operative position to the pointer.

A solid body 110′ occupies the space between the two cams 110a and 110b, and has smooth sides sloping gradually from the periphery of one cam to the periphery of the other, so that as the cam and pinion assembly is moved axially, the cam-contacting tail of the pointer 102′ will slide smoothly over the solid body 110′ from one cam to the other.

The pinion 100 in this embodiment is made sufficiently wide (in an axial direction) so that it remains in meshing engagement with the driving gear member 98 during the axial shifting of the cams from one position to the other. As before, the gear member 98 is operatively connected to the exposure value setting means 34 and 28 on the shutter assembly.

In this embodiment, the shifting of the cams is coupled to the movement of the mask or flap 109a. The flap has an arm 109′ which carries a pin 109″ engaging in an annular groove 110″ below the cam 110b. The operating arm 109′ is bent at an angle to the plane of the mask 109a, as seen in Fig. 9. The flap 109a is provided with the colored marking 202 for the same purpose previously described.

The operation of this embodiment of the invention will be readily apparent from what has been said above. When the mask or flap 109a is in the open position as shown in Figs. 8 and 9, so that the exposure meter operates in its dim light or high sensitivity range, the pin 109″ shifts the pinion and cam assembly axially downwardly so that the upper cam 110a lies opposite the cam-follower portion of the follow-up pointer 102′, and the periphery of this cam now controls the position of the pointer. A light coil spring 115a surrounding the shaft of the pinion and cam assembly presses downwardly on this assembly and thus tends to keep the mask 109a in the open position. If the mask is swung downwardly to cover the photocell, to place the exposure meter in the bright light or low sensitivity range, the downward motion of the mask produces an upward swinging motion of the arm 109′, so that the pin 109″ shifts the pinion and cam assembly axially upwardly, bringing the lower cam 110b opposite the follow-up pointer 102′, so that it is now the periphery of the lower cam which controls the position of the pointer. When the mask reaches its fully closed position, it is resiliently latched in this position by engagement with a latching leaf spring 115b.

In order to obtain maximum accuracy of setting, play or backlash is preferably eliminated in the various moving parts by known means, such as light springs 111 which take up the backlash.

The necessary shapes of the cams which control the follow-up pointer can easily be determined by those skilled in the art, either by calculation or by empirical trial. One advantage of using cams rather than a direct connection of the follow-up pointer to a rotary shaft, is that the cams can be so shaped as to correlate the movements of the follow-up pointer properly to the non-linear movements of the exposure meter pointer. It is well known in the art that the movement of an exposure meter pointer is non-linear with respect to changes in illumination value, the non-linearity being particularly pronounced near the extreme ends of the scale. For this reason, when a follow-up pointer is directly connected to a rotary member which rotates linearly with respect to changes in exposure value, it has usually been necessary to connect the various setting positions of the follow-up pointer to the corresponding positions of the exposure meter pointer by means of distorted lines, as shown for example at 49 in Fig. 1 of Fahlenberg application 576,634, now Patent 2,849,936, granted September 2, 1958. But when the follow-up pointer is operated by a cam, as is done in all embodiments of the present invention, then the shape of the cam may be so chosen as to correlate the linear or uniform rotation of the cam to a non-linear swinging of the follow-up pointer to make it correspond to the non-linear swinging of the exposure meter pointer, thereby enabling the accurate setting of the follow-up pointer in direct alinement with the exposure meter pointer without the necessity for using distorted lines.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising, in combination, a camera body, a photoelectric exposure meter mounted on said body for operation through a plurality of sensitivity ranges, said meter including an indicating pointer movable within a given range of travel when said meter is operating in one of its sensitivity ranges and movable within substantially the same range of travel when said meter is operating in another of its sensitivity ranges, a shutter assembly mounted on said camera body, said shutter assembly having movable parts settable to any selected one of a series of exposure values within a range, and follow-up pointer means mounted on said camera body adjacent said indicating pointer, characterized by the provision of a gear rotatably mounted on said camera body adjacent said follow-up pointer means, driving means operatively connecting said movable parts of said shutter assembly to said gear to position said gear rotationally by movement of said movable parts of said shutter assembly through an exposure value range, and two cams connected to said gear to turn therewith, one of said cams operating said follow-up pointer means through a visible range adjacent that of said indicating pointer during movement of said movable parts through one portion of the exposure value range, the other of said cams operating said follow-up pointer means through substantially the same visible range during movement of said movable parts through another portion of the exposure value range.

2. A construction as defined in claim 1, in which said exposure meter includes a movable mask shiftable to one position to cause operation of said exposure meter in one of its sensitivity ranges and to another position to cause operation of said exposure meter in another of its sensitivity ranges, and means interconnecting said cams and said mask to render one or the other of said cams selectively operative on said follow-up pointer means by the movement of said mask.

3. A construction as defined in claim 1, in which said exposure meter includes a movable mask shiftable to one position to cause operation of said exposure meter in one of its sensitivity ranges and to another position to cause operation of said exposure meter in another of its sensitivity ranges, and in which said follow-up pointer means comprises a single follow-up pointer operated selectively by one or the other of said cams, further including means operated by movement of said mask from one of its positions to another, for shifting said cams from a position in which one of them is in operative relation to said follow-up pointer to a position in which the other of them is in operative relation to said follow-up pointer.

4. A photographic camera comprising shutter mechanism having exposure value setting means movable through a range of exposure values, a light meter having a photocell and a movable pointer moved in accordance with variations of light falling upon said photocell, movable means for changing the sensitivity of said photocell, follow-up pointer means movable to a predetermined position with respect to said light meter pointer, transmission means for operatively connecting said follow-up pointer means to said exposure value setting means in two different relationships so that a given position of said follow-up pointer means may correspond to one position of said exposure value setting means while said light meter is operating at one sensitivity and may correspond to a materially different position of said exposure value setting means while said light meter is operating at a different sensitivity, said transmission means including one cam for determining the effective position of said follow-up pointer means for one range of sensitivity of said light meter and a second cam for determining the effective position of said follow-up pointer means for a second range of sensitivity of said light meter, and means operated by movement of said means for changing the sensitivity of said photocell, for selectively rendering one or the other of said cams effective to determine the position of said follow-up pointer means and for rendering the other of said cams ineffective.

5. A construction as defined in claim 4, in which said follow-up pointer means comprises a single cam follower part, and in which said two cams are connected to each other to rotate in unison about a common axis of rotation and are also shiftable in unison in the direction of said axis, and in which said means for rendering one or the other of said cams effective comprises an operative connection between said means for changing the sensitivity of said photocell and said cams to shift said cams in the direction of said axis by movement of said sensitivity changing means, to bring one or the other of said cams selectively into operative engagement with said cam follower part.

References Cited in the file of this patent

UNITED STATES PATENTS

| | | |
|---|---|---|
| 2,209,156 | Fischer | July 23, 1940 |
| 2,241,020 | Nerwin | May 6, 1941 |
| 2,305,294 | Kuppenbender | Dec. 15, 1942 |
| 2,340,622 | Simmon | Feb. 1, 1944 |
| 2,341,393 | Simmon | Feb. 8, 1944 |
| 2,418,370 | Simmon | Apr. 1, 1947 |